Dec. 12, 1972   J. G. FRANCIS ET AL   3,705,935
PROCESS FOR FORMING FABRIC-CARRIED PLASTIC ARTICLE
Original Filed March 22, 1967

United States Patent Office 3,705,935
Patented Dec. 12, 1972

3,705,935
PROCESS FOR FORMING FABRIC-CARRIED PLASTIC ARTICLE
James G. Francis, Hialeah, and Robert H. Pasley, Sr., Coral Gables, Fla., assignors to Royalty Designs of Florida, Hialeah, Fla.
Original application Mar. 22, 1967, Ser. No. 625,214. Divided and this application Feb. 6, 1970, Ser. No. 13,216
Int. Cl. B29h 9/02
U.S. Cl. 264—257
7 Claims

ABSTRACT OF THE DISCLOSURE

A fabric-carried solid resilient quivery mass of plastic is made by molding a polyvinyl chloride plastisol against a fabric. The plastisol comprises at least substantially 400 parts of plasticizer for each 100 parts of resin and is heated to about 340 degrees F. through a gel state to a liquid state before molding.

---

This application is a division of Ser. No. 625,214, filed Mar. 22, 1967 now abandoned for "Fabric-Carried Plastic Article and Process for Forming the Same."

The present invention is concerned with techniques for attaching highly resilient plastic articles to fabrics and with the novel products so formed.

Various types of plastic articles have heretofore been applied to fabrics for decorative and other purposes by such techniques as heat-bonding, adhesive applications, molding and the like. Such techniques, however, have not lent themselves well to matching the resilient properties (such as stretch, elasticity, contraction, etc.) of the plastic article to that of the fabric, or for permitting a satisfacory match of a single plastic formulation to a wide variety of different types of fabrics of different stretch, elasticity and other characteristics. In addition, prior molding techniques have often weakened or damaged the fabric and, in general, have not permitted a flexible bonding to the fabric that enables the fabric adequately to give, relative to the plastic, upon pull or other stresses that may be applied in use to the plastic decoration or other article.

An object of the present invention, accordingly, is to provide a new and improved process for forming fabric-carried plastic articles that shall not be subject to any of the abovedescribed disadvantages; but, to the contrary, admirably matches a wide variety of fabrics to plastic articles with a highly flexible union.

A further object is to provide a novel fabric-carried plastic article.

Other and further objects will be explained hereinafter and more fully delineated in the appended claims. In summary, however, the invention embraces a fabric-carried article comprising a fiber-formed fabric carrying at a predetermined region thereof a quivery resilient plastic member extending forward in relief beyond one side of the fabric and rearwardly coating the fibers on both sides of the fabric while locking between the fibers and extending into a substantially planar surface over said region contiguous with the opposite side of the fabric. Preferred details, compositions and processes of formation are hereinafter set forth.

The invention will now be described in connection with the accompanying drawing:

FIG. 1 of which is a fragmentary isometric view, upon a magnified scale, of a novel article formed by the processes of the invention;

Figure 1:

Referring to FIG. 1, a quivery resilient plastic article is shown carried upon a woven-fiber or other fiber-formed cloth fabric 3 or the like for such purposes as decorating the same. In accordance with the invention, the plastic of the article 1 has been plasticized to an extraordinary degree to render it quivery, as schematically shown by the motion lines, and generally more resilient (i.e., more flexibly stretchable and compressible) than the fabric 3; and, through a highly critical manner of attachment to the fabric fibers, is adapted at least to match the stretch and other characteristics of a wide variety of fabrics ranging even to highly elastic fabrics. It will be noted that the article 1 projects or extends forward in relief (to the right) to constitute the decoration, usually of thickness very much greater than that of the fabric, as shown. The plastic article 1 extends, also, rearwardly, integrally covering and coating the fibers 3' of the fabric 3 on both sides, locking between the same, and extending into a substantially planar surface 1' covering the region of attachment of the article 1 and contiguous with the left or rear side of the fabric.

It has been discovered that a rather critical degree of control of the plasticizer within highly unconventional limits, coupled with the particular attachment construction of FIG. 1, attains the desirable results above stated, obviating the beforementioned problems with prior-art plastic decorations and the like. As an example, and as a preferred embodiment, polyvinyl chloride plastisols may be adapted to the purposes of the present invention by radically increasing the conventional percentage of plasticizer to a range of from substantially 400 to substantially 600 parts for each 100 parts of polyvinyl chloride.

Figure 2:
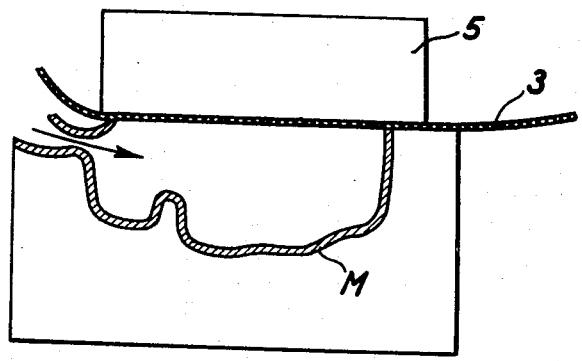
FIG. 2 is a longitudinal section illustrating preferred molding techniques.
Figure 3:
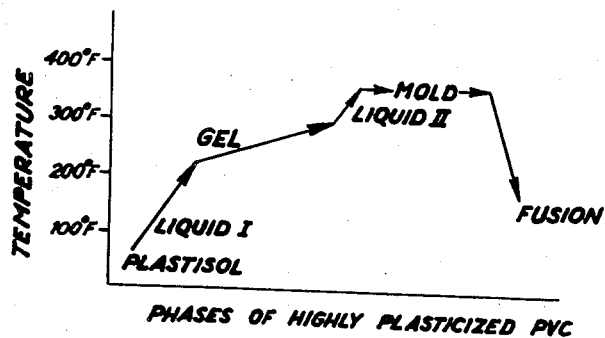
FIG. 3 is an explanatory flow-chart graph.

The use of such a plastisol for the purposes of the invention is illustrated in the flow-chart of FIG. 3 in connection with the molding process illustrated in FIG. 2, wherein an open-top mold M (corresponding to the intended article 1) receives hot liquid-state plastic in the direction of the arrow. The fabric 3 covers the mold, and the fabric is caused by pressure from above, as effected by the member 5, to absorb the plastic between its fibers through to the upper side thereof, whereupon the plastic is permitted to set into the quivery resilient mass 1–1', flexibly united with the fabric 3.

It has been found necessary for optimum and highly reproducible results, to carry the room-temperature liquid plastisol ("LIQUID I," FIG. 3) to and through elevated temperatures in the range of from about 220° to 280° F. where it becomes gelatinous ("GEL," FIG. 3), and then to carry the gel to even higher temperatures to bring the same into a different high-temperature liquid state ("LIQUID II," FIG. 3). At about 340° F., more or less, proper viscosity is attained to permit injection into, for example, a flexible mold M and to permit wetting of a wide variety of fabrics 3 and absorption of the plastic into and around the fabric fibers 3' through to the opposite side. Alternatively, the mold M may be of copper or the like and the member 5 may be a sponge pressed against the fabric 3 to force the plastic into the fabric. Cooling results in fusion or solidifying of the quivery resilient mass 1 at about 170° F.

The criticality of the substantially 400 to 600 parts plasticizer range (per 100 parts polyvinyl chloride) results from the fact that if less than about 400 parts plasticizer are used, it has been found difficult to pass the highly plasticized plastisol through the "GEL" stage to the necessary "LIQUID II" stage, even with increased temperature; and if more than about 600 parts plasticizer are used, the plasticizer has been found deleteriously to migrate out of the finished product 1 as an oily substance.

It has been found that, in addition to the highly desirable fabric-matching and other characteristics attainable with the invention, repeated washing and drying of the fabric 3 carrying the plastic article 1 produces no detectable deteriorating effects upon either, the product being extremely durable. Included in the list of fabrics found usable in accordance with the invention are cotton, wool, silk, polyester-cotton, canvas, felt, rayon, terrycloth, twill, corduroy and stretchable fabrics. A preferred plasticizer for use with Type 121 PVC plastic, moreover, in the proportions above given, is "Flexol" 380. Clearly, other plastics and plasticizers of similar properties, controlled as above indicated, may also be employed.

Further modifications will also occur to those skilled in the art, and all such are considered to fall within the spirit and scope of the invention as defined in the appended claims.

What is claimed is:

1. A process for forming a fabric-carried solid resilient quivery mass of plastic, that comprises, providing a highly plasticized polyvinyl chloride in plastisol form comprising at least substantially 400 parts of plasticizer for each 100 parts of resin which, upon heating, passes through a gel state to a high-temperature liquid state, rendering said highly plasticized polyvinyl chloride molten by heating the plastisol of the same to above substantially 300 degrees F. through said gel state to said high-temperature liquid state, molding the heated plastisol into the interstices of a fiber-formed fabric while in said high-temperature liquid state, and cooling the same to set the highly plasticized polyvinyl chloride into a solid resilient quivery mass extending in relief from said fabric.

2. A process as claimed in claim 1 and in which said plastisol is formed of from substantially 400 to substantially 600 parts of plasticizer for each 100 parts of resin.

3. A process as claimed in claim 1 and in which the said molding comprises filling an open-top mold with the molten polyvinyl chloride and pressing the fabric against the molten polyvinyl chloride at the top of the mold.

4. A process as claimed in claim 3 and in which the fabric is pressed against the molten plastic sufficiently to force the polyvinyl chloride between and over the fibers on both sides of the fabric.

5. A process for forming a solid resilient quivery mass of plastic upon and in substantial relief from a substantially planar backing surface, that comprises, rendering molten highly plasticized polyvinyl chloride having at least substantially 400 parts of plasticizer for each 100 parts of said polyvinyl chloride by heating the same from its room-temperature liquid state through a gel state to a second, high-temperature liquid state at a temperature above substantially 300 degrees F., molding the same upon said backing surface while in said high-tempertaure liquid state, and cooling the same to set the highly plasticized polyvinyl chloride into a solid resilient somewhat oily quivery mass of plastic extending in relief from said backing surface and of thickness very much greater than said backing surface.

6. A process as claimed in claim 5 and in which the said molding comprises filling with said plastic in high-temperature liquid state an open-top mold of substantial cavity thickness very much greater than the top surface thereof.

7. A process as claimed in claim 5 and in which the heating to attain the said gel state is at temperatures of from about substantially 220 degrees to 280 degrees F. and to attain the second, high-temperature liquid state at a temperature of about substantially 340 degrees F.

References Cited
UNITED STATES PATENTS

| | | | |
|---|---|---|---|
| 529,782 | 11/1894 | Crispin | 264—257 |
| 2,979,778 | 4/1961 | Fitzsimons. | |
| 3,423,357 | 1/1969 | Suh | 260—30.6 |

ROBERT F. WHITE, Primary Examiner

A. M. SOKAL, Assistant Examiner

U.S. Cl. X.R.

260—31.8 R; 264—259